United States Patent [19]

Serradimigni

[11] 4,423,463

[45] Dec. 27, 1983

[54] COMBINED CAPACITOR AND RESISTOR

[75] Inventor: Charles M. Serradimigni, Hudson Falls, N.Y.

[73] Assignee: General Electric Company, Hudson Falls, N.Y.

[21] Appl. No.: 328,308

[22] Filed: Dec. 7, 1981

[51] Int. Cl.³ .................... H03H 1/00; H01G 4/18; H01G 1/14
[52] U.S. Cl. ................................ 361/275; 29/25.42; 361/309; 361/323
[58] Field of Search ................. 361/275, 309, 323; 29/25.42

[56] References Cited

U.S. PATENT DOCUMENTS

| | | | |
|---|---|---|---|
| 1,560,310 | 11/1925 | Pfanstiehl | 361/275 X |
| 1,563,754 | 12/1925 | Latour | 361/275 X |
| 2,328,520 | 8/1943 | West | 242/56 |
| 3,153,180 | 10/1964 | Bellmore | 317/260 |
| 3,302,081 | 1/1967 | Grahame | 317/256 |
| 3,906,312 | 9/1975 | Stietvator | 361/323 X |
| 4,037,298 | 7/1977 | Flanagan et al. | 317/260 |
| 4,226,011 | 10/1980 | Hunt | 361/309 X |

FOREIGN PATENT DOCUMENTS 1163434  9/1969  United Kingdom ............... 361/275

*Primary Examiner*—Donald A. Griffin
*Attorney, Agent, or Firm*—James J. Lichiello; Arthur E. Bahr

[57] ABSTRACT

In a metallized capacitor roll with margin electrodes offset at each roll end, a resistor is placed axially in the roll so that one end contacts an electrode across a margin and the other end protrudes from the roll end to be contacted by the schooping metal at the roll end.

8 Claims, 3 Drawing Figures

U.S. Patent  Dec. 27, 1983  4,423,463
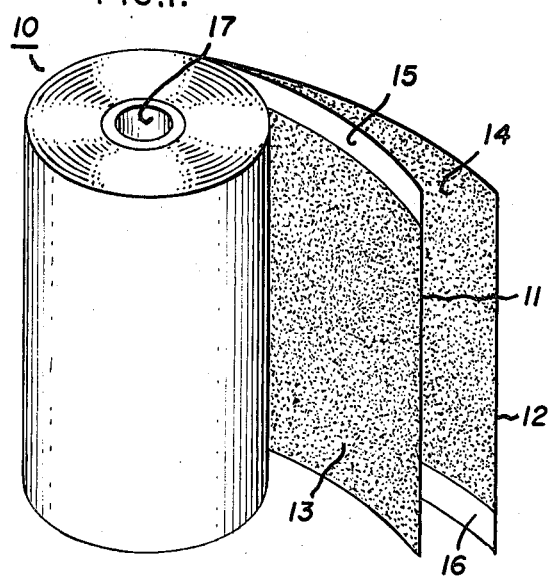
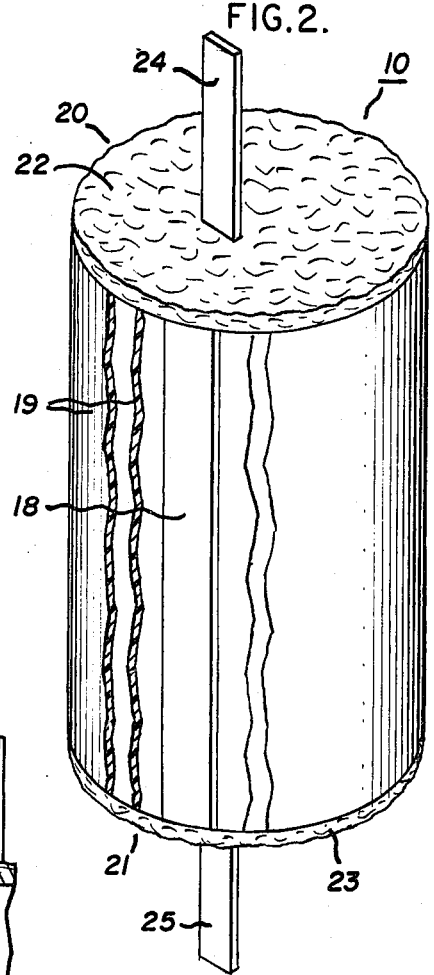
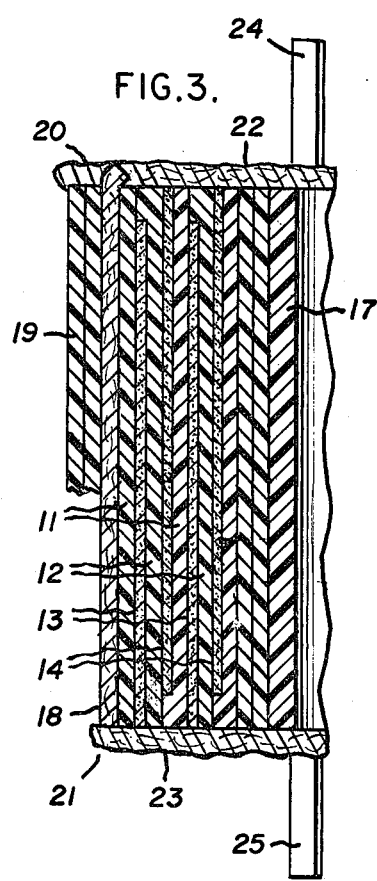

COMBINED CAPACITOR AND RESISTOR

This invention relates to a combined electrical capacitor and resistor and more particularly to a metallized synthetic resin capacitor roll where a resistor is incorporated in the roll winding intermediate the roll ends.

BACKGROUND OF THE INVENTION

Electrical resistors are used in combination with capacitors to reduce the electrical charge on a capacitor after the capacitor is disconnected from its circuit. Specifications usually require that the charge be reduced to a safe value within a predetermined period of time. It has been a prior practice to connect a resistor element of a predetermined value between the electrodes of a capacitor. In a capacitor which is contained in a case and filled with a dielectric fluid a resistor element may be utilized inside of the can and between the capacitor leads. One example of this combination is disclosed and described in U.S. Pat. No. 3,302,081-Grahame, assigned to the same assignee as the present invention.

In a capacitor roll section made up of alternate strips of electrode foil and dielectric material, a resistor element may be made up of a carbon loaded paper and inserted into the capacitor roll to contact each foil, at the end of the roll. One example of such a resistor is disclosed and claimed in U.S. Pat. No. 3,840,787-Grahame, assigned to the same assignee as the present invention.

It is difficult to incorporate a resistor in a dry metallized capacitor such as disclosed and described in U.S. Pat. No. 4,037,298-Flanagan, assigned to the same assignee as the present invention. In the Flanagan patent a capacitor roll section is made up of strips of a synthetic resin dielectric, such as polypropylene, on one side of which a very thin metal layer of aluminum, for example, is vapor deposited. These strips are wound together very tightly in a round roll form and may then be used in dry form, i.e., unimpregnated with a dielectric fluid, and perhaps merely encased in a plastic jacket, or, impregnated with a fluid in the usual manner. Automated manufacture of these capacitors make it uneconomical to connect a separate resistor between the electrode leads of the capacitor, and the difficulties of providing an electrical connection between the resistor and the metallized layers also make the insertion of a carbon loaded paper or other electrode interconnection means less desirable.

SUMMARY OF THE INVENTION

It has been discovered that a flexible strip resistor may be incorporated in a dry metallized capacitor roll by arranging the strip to lie adjacent the finished capacitor roll intermediate the roll ends so that the sprayed metal connection at each end of the roll also connects the considerable length of resistor strip with the capacitor electrodes. The jacket material or several turns of dielectric material around the capacitor roll protects the resistor.

THE DRAWINGS

This invention will be better understood when taken in connection with the following description and drawings in which, FIG. 1 illustrates a preferred form of this invention as a dry metallized capacitor roll section with a discharge resistor incorporated therewith.

FIG. 2 is an exaggerated, sectional, cutaway view of FIG. 1 illustrating a discharge resistor connected to the schooped ends of a capacitor.

FIG. 3 is a cutaway view of the embodiment of FIG. 2 illustrating the position of the resistor strip adjacent the circumference of the capacitor roll.

DISCUSSION OF PREFERRED EMBODIMENTS

Referring now to FIG. 1, there is disclosed one preferred embodiment of this invention as a capacitor roll section 10. Roll section 10 comprises a pair of dielectric material strips 11 and 12 which have been metallized as illustrated by metallized surfaces or coatings 13 and 14. As is the usual practice, the strips 11 and 12 are metallized in a manner which leaves metal free margins 15 and 16 along opposite edges of the roll 10. As illustrated in FIG. 1, the roll 10 is provided with a hard core 17 which may be of a tubular or solid form and is coextensive through the roll. Core 17 is preferably of a hard non-conductive material such as one of the synthetic resins, for example, polypropylene. In the practice of this invention, core 17 is used as a single use arbor on which to wind hard roll 10 much in the manner described in U.S. Pat. No. 3,153,180-Bellmore, assigned to the same assignee as the present invention. The winding process to wind a hard roll 10 may be carried out on various winding machines, the one shown in U.S. Pat. No. 2,328,520-West, assigned to the same assignee of the present invention being one example.

In the winding process of roll 10, the strips 11 and 12 are laterally offset with respect to each other in order that each roll edge or end will display an offset with its metallized coatings at the edge of the strip. Therefore, suitable leads may be attached to the roll ends through utilization of the well known schooping process. There is minimal danger of the schooping material penetrating sufficiently into the roll edge to electrically short the other metallized surface because of the free margin construction.

Referring now to FIG. 2 there is illustrated a preferred application of the resistor of this invention to the capacitor roll section 10 of FIG. 1. After the roll section of FIG. 1 is wound in roll form on a roll winding machine, a resistor strip element 18 is placed adjacent the roll as illustrated in FIG. 2. Thereafter several turns of an unmetallized dielectric 19 is wound about the roll to retain the resistor 18 in its illustrated position. Dielectric turns 19 are ordinarily used to hold the roll 10 strips in position, to protect the roll from undue abrasion, etc. and more particularly to act as a shrunk on sleeve for the roll 10. In this latter connection, when the roll 10 is heated the sleeve will shrink radially to tightly engage the roll for retained tightness.

As illustrated in FIG. 2, with the roll in its wound form, and resistor element 18 in position, the ends 20 and 21 of the roll section 10 are coated with layers 22 and 23 of an appropriate bonding metal (such as aluminum for example) by means of a schooping process or other appropriate process. In this instance, the schooping metal layers 22 and 23 cover each end of the roll section 10 respectively, and make contact with the resistor element 18, at the same time as they make contact with the leads 24 and 25. This contacting means is best shown with respect to FIG. 2.

Referring now to FIG. 3, the capacitor roll 10 is shown in a partial and cross-sectional view to illustrate the relationship of the elements. In FIG. 3 the dielectric strips 11 and 12 are offset with respect to each other so that one of the metallized surfaces 14 extends at the upper end 26 of roll 10 and the other metallized surface 13 extends at the lower end 21 of roll 10. The resistor element 18 lies adjacent the outer part of the roll 10 and its ends either extend slightly past one end of the roll 10, as shown at the upper end 20 of roll 10, or is generally flush with the roll 10 as shown at the bottom end 21. Thereafter, one or more turns 19 of a suitable dielectric strip are wound about roll 10 to serve as a means of protection to the resistor element 18 and to serve as a protective wrapper or casing for the roll.

After assembly as illustrated in FIG. 3, the roll ends 20 and 21 are subjected to a schooping operation whereby a molten metal such as aluminum or zinc is spray-coated over the ends of 20 and 21 of the roll to form the conducting metal layers 22 and 23. The conducting metal 22 and 23 contact the exposed metallized layers 13 and 14 of the capacitor roll 10, and while so doing, also contact the ends of the resistor element strip 18. The resistor ends (or the leads of a resistor) may be positioned at the very end of the roll 10 as to slightly overlap the ends. They may also be slightly shorter than the roll depending on the precise bounds of the schooped metal layer. A pair of leads 24 and 25 for the electrodes of the capacitor are joined to the schooped layers 22 and 23. By this means separate joining soldering or welding operations or other resistor locations are eliminated. The preferred resistor concept of this invention is applicable only to those capacitors which have metallized dielectrics and schooped ends.

The resistor element 18 of this invention may take the form of many well known types of flexible or thin strip resistors, so long as they lie closely adjacent the capacitor roll section with minimum projection, and whose ends may be easily schooped by the same process used to schoop the ends of the capacitor. In a preferred form of this invention the resistor 18 is a paper strip in which a carbon material has been incorporated to provide a predetermined resistance per unit of length of strip.

While resistor 18 may be positioned elsewhere in the roll it is preferred to utilize it at the outer extremity of the roll where capacitor operating temperature effects of the roll are minimized and where the resistor 18 is not in the electrical field. It is not desirable to position the resistor 18 in the interior portion of the capacitor roll for capacitors rated above about 250 volts AC because these capacitors must be wound extremely tightly with close tolerances in order to eliminate all gaps and spaces, and the presence of a resistor strip between the roll windings could cause problems.

In one practice of this invention capacitor rolls were made up in accordance with the structure shown in FIG. 3. The capacitor was rated at 240 VAC and was about 1.5 inches in length and 0.75 inch in diameter. Alternate resistors 18 used carbon loaded paper strips of 0.5 inch width and about 1.5 and 0.1 inches length. The resistor strip was placed flush with the roll and held in place by several turns of unmetallized polypropylene. The resistor element was about as long (or wide) as the roll and the resistor ends were exposed at each end of the roll. Both ends of the roll were schooped and the metal spray from this operation joined the capacitor electrodes and the resistor ends in one operation. The practice of this invention may be applied to capacitors other than roll capacitors such as flat or stacked capacitors which are also metallized and which use schooped ends to join the electrodes. The cross-section of a flat or stacked capacitor reveals the same array of superimposed contiguous layers of dielectric and metallized layers. In a flat capacitor, one dimension, such as a width, is a predetermined dimension, and the resistor element or its leads is at least of the same dimension so that in the assembled relationship each of the resistor ends or leads are exposed at a respective end of the capacitor for the schooping material. The resistor strip lies flush with the flat stack. It is important in this invention that any capacitor section be a metallized section and the resistor to be quite flat to fit flush with the capacitor section so that the schooping operation provides a simultaneous electrode and resistor connection.

The practice of this invention is applicable to various metallized capacitors regardless of the dielectric material, e.g. metallized paper, metallized polypropylene and other metallized materials. It is the simultaneous joining of the resistor ends by the metal spray or schooping process which is more important. In this connection the resistor element 18 may take various alternate shapes and modifications. For example, an electrically conducting liquid or ink may be deposited on the exterior of the capacitor roll 10, for example, by printing, depositing or spraying, and then dried or solidified to form resistor 18 of an appropriate shape and resistance. The resistor may also be a suitable wrap material of for example, an electrically conducting synthetic resin or paper material and wrapped about roll 10 in the same manner and position as wrap 19, although a further non-conducting wrap may then be desirable.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In an electrical capacitor comprising an array of dielectric strips with metallized electrodes thereon, said strips being arranged in contiguous layer relationship with alternate metal electrodes and dielectric layers, said strips having a predetermined length and arranged in offset relationship so that alternate metallized layers are evenly exposed at each end of the array, and a resistor positioned adjacent a dielectric strip in layer relationship thereto with the ends of said resistor extending at least to about the ends of said array, and a schooped metal layer at each end of said array to simultaneously connect one end of said resistor and one electrode of said capacitor at each end of said array.

2. The invention as recited in claim 1 wherein said resistor is a thin flexible strip material.

3. The invention as recited in claim 2 wherein said resistor is a flexible strip extending about the ends of said roll.

4. The invention as recited in claim 3 wherein said roll comprises strips of metallized synthetic resin film.

5. An electrical capacitor comprising a series of metallized dielectric strips wound in a roll form of a predetermined width and in offset relationship so that one edge of one metallized coating of one dielectric of strip is exposed at each end of the roll, and a resistor element adjacent said roll in coaxial and contiguous relationship thereto with the ends or leads of said resistor being at least at the ends of the roll, and a schooped layer of metal on each end of said roll and simultaneously joining said resistor and one of said electrodes in electrical connection at each end of said roll.

6. The invention as recited in claim 5 wherein said resistor element is a flexible strip of a dielectric material which incorporates an electrically conductive material therein to provide a predetermined resistance.

7. The invention as recited in claim 6 wherein additional layers of a dielectric material are wound about said roll and said resistor.

8. A method of incorporating a resistor in a capacitor roll comprising
   (a) winding metallized dielectric strips in roll form to provide a capacitor whose electrodes are offset at each end of the roll;
   (b) inserting a resistor strip element adjacent the roll so that the ends of the resistor are positioned at about the roll ends;
   (c) winding a dielectric strip about said roll and said resistor;
   (d) schooping the ends of said roll to simultaneously join said resistor ends and said capacitor electrodes.

* * * * *